2,928,755

METAL-COATED CERAMIC ARTICLE AND PROCESS FOR PRODUCING THE SAME

Wilhelm Brandstädt, Arnstadt, and Helmut Wlokka, Erfurt, Germany, assignors to VEB Funkwerk Erfurt, Erfurt, Germany No Drawing. Application January 28, 1958
Serial No. 711,552

3 Claims. (Cl. 117—22)

The present invention relates to a metal-coated ceramic article and a process for producing the same. More particularly the invention relates to a process for producing a metallic coating on a ceramic body consisting of highly sintered aluminum oxide.

The application of the metallic coating serves mainly as a means for permitting soldering connections to be made between the ceramic part and a metal part when special requirements are present, for instance when the connection should be absolutely vacuum-tight or have great mechanical strength, or both. This requirement is, for instance, called for in the production of electrical discharge tubes or in the production of soldered connections between metal and ceramic parts, or in applying thin ceramic cutting plates on metallic supports, preferably of steel, for chip-removing tools, and for similar purposes.

The known processes for producing a metallic coating on ceramic parts refer mostly to ceramic bodies of highly sintered magnesium and aluminum silicates and their mixtures. Ceramic parts consisting of highly sintered aluminum oxide (sintered aluminous clay) are considered to give poorly adherent metal coating and to resist soldering altogether. For obtaining an adhesive metal coating on a ceramic body, the processes hitherto known apply on the surface of the ceramic body a powdered mixture containing iron, molybdenum, tungsten, or nickel, preferably with an appropriate amount of manganese; of the mixture, at least one coat is applied and the whole is then heated in a reducing atmosphere or in vacuo to a high temperature, preferably above the melting point of manganese.

It is furthermore known to apply a coat of metal powder, preferably tungsten, molybdenum, or rhenium, to a ceramic body, then to sinter this coat while maintaining the porous structure, and finally to solder the body with a high-melting solder, preferably silver-copper or hard solder, which is wetting the metal of the porous coat without alloy formation, or which is absorbed by it as it would be by a sponge.

According to another well-known process, a metal coating can also be produced on a ceramic part by applying thereto titanium, zirconium or titanium hydride with subsequent thermic treatment.

As an aid in the coating process, metal oxides, which act as a flux, for instance $MnO_2$, $TiO_2$, $BaO$, $CaO$, are added to the suspension of the metal powder.

The ceramic substances consisting of magnesium and aluminum silicates, which were hitherto considered as being the only ones capable of being soldered, possess a lower resistance to changes of temperature and a low mechanical strength because of their high coefficients of expansion. This low strength does not allow the performance of butt-soldering techniques, since the occurring tensions cannot be resisted by the ceramic substance and breakages will occur; apart therefrom, it is almost impossible to accomplish a vacuum-tight connection with these compounds.

It is the object of the present invention to overcome the above named shortcomings of known processes and to provide a process for producing a metallic coating on a ceramic body consisting of highly sintered aluminum oxide, that will be adherent, resistant to temperature changes, and will stand high mechanical stress.

It is a further object of this invention to provide a process for producing a metallic coating on a ceramic body consisting of highly sintered aluminum oxide that will make vacuum-tight connections possible.

It is yet another object of this invention to provide a metal-coated ceramic article having the above outlined characteristics.

Other objects and advantages of the invention will become apparent from the following detailed description.

With the above objects in view, advantage is taken in carrying out the invention of the high resistance to temperature change and the great mechanical strength possessed by pure, highly sintered aluminum oxide, also known as sintered aluminous clay. By highly sintered it is here understood that the ceramic body has a sintering temperature of approximately 1800° C.

For producing a metallic coating on a ceramic body of said highly sintered aluminum oxide, we apply according to this invention a mixture of different powdered components: one metallic component is copper which liquefies during the following sintering operation, and another metallic component is manganese. As a third component, zirconium oxide is used which serves as a flux. In the mixture the ratio of copper and manganese is 2:1, and the zirconium oxide is added in an amount ranging from 2 to 20 percent, preferably 7 percent, by weight, of the total mixture.

The process is carried out by applying the powdered mixture of the three ingredients to the highly sintered aluminum oxide body and heating said mixture to a sintering temperature of about 1400° C., whereby a metallic coating is formed on the ceramic body.

This process according to the invention offers the advantage that the metallization occurs below the softening point of the ceramic material, since as stated above the softening point of highly sintered aluminum oxide is at approximately 1800° C.

In the processes hitherto known, the heating during the sintering operation had to be effected at a temperature near the softening point of the ceramic material.

It is another important advantage that sintering is completed within an unusually short time, i.e., after 5–10 minutes, whereas the known methods require sintering periods of up to one hour. As an example of a metal-coated ceramic article in accordance with the invention we may mention ceramic cylinders with metallized front faces obtained as above described, and joined in a vacuum-tight manner to metal parts, preferably of molybdenum, or to an alloy having a suitable coefficient of expansion.

We claim:

1. A metal-coated ceramic article comprising a body of highly sintered aluminum oxide with a coating derived from a mixture of copper and manganese in the approximate ratio of 2:1 and an addition of zirconium oxide in an amount of 2–20% by weight.

2. A process for producing a metallic coating on a ceramic body consisting of highly sintered aluminum oxide which comprises applying to said ceramic body having a sintering temperature of approximately 1800° C. a mixture of powdered ingredients consisting of copper and manganese in the approximate ratio of 2:1, and of zirconium oxide in an amount ranging from 2-20% by weight of the total mixture, and heating said powdered mixture to a sintering temperature of about 1400° C., whereby a metallic coating is formed on said ceramic body.

3. The process as claimed in claim 2, wherein the amount of zirconium oxide is about 7% by weight of the total mixture.

References Cited in the file of this patent

UNITED STATES PATENTS

| | | |
|---|---|---|
| 2,407,995 | Moyer | Sept. 24, 1946 |
| 2,467,144 | Mochel | Apr. 12, 1949 |
| 2,775,531 | Montgomery et al. | Dec. 25, 1956 |

FOREIGN PATENTS

| | | |
|---|---|---|
| 742,770 | Great Britain | Jan. 4, 1956 |